US009641707B2

(12) United States Patent
Kanbayashi

(10) Patent No.: US 9,641,707 B2
(45) Date of Patent: May 2, 2017

(54) OPERATION SCREEN OF AN IMAGE FORMING APPARATUS BEING DISPLAYED ON A PORTABLE DEVICE BASED ON THE POSITION OF THE PORTABLE DEVICE

(71) Applicant: KYOCERA Document Solutions Inc., Osaka (JP)

(72) Inventor: Ryo Kanbayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/870,239

(22) Filed: Sep. 30, 2015

(65) Prior Publication Data
US 2016/0094736 A1    Mar. 31, 2016

(30) Foreign Application Priority Data

Sep. 30, 2014    (JP) .................................. 2014-200949

(51) Int. Cl.
*H04N 1/00* (2006.01)
*G06F 3/12* (2006.01)

(52) U.S. Cl.
CPC ..... *H04N 1/00392* (2013.01); *H04N 1/00307* (2013.01); *H04N 1/00411* (2013.01);
(Continued)

(58) Field of Classification Search
CPC .............. G06F 3/1292; H04N 1/00392; H04N 1/00493; H04N 1/00482
(Continued)

(56) References Cited

U.S. PATENT DOCUMENTS

| 2013/0044341 | A1 | 2/2013 | Uchino | |
| 2014/0211252 | A1* | 7/2014 | Tsujimoto | H04W 4/008 358/1.15 |
| 2015/0169272 | A1* | 6/2015 | Sakai | G06F 3/1292 358/1.15 |

FOREIGN PATENT DOCUMENTS

| JP | 2002055753 A | 2/2002 |
| JP | 2003195998 A | 7/2003 |

(Continued)

OTHER PUBLICATIONS

Notice of Reasons for Refusal mailed by Japan Patent Office on Jul. 19, 2016 in the corresponding Japanese patent application No. 2014-200949.

*Primary Examiner* — Eric A Rust
(74) *Attorney, Agent, or Firm* — IP Business Solutions, LLC

(57) ABSTRACT

An information processing apparatus includes: a display section displaying a first operation image for user operation; a display control section; a detection section detecting an approach direction of a predefined communication device approaching the display section; a storage section storing, besides the first operation image of the display section, plural second operation images associated with the approach direction; a communication control section reading, from the storage section, the second operation image associated with the approach direction detected by the detection section, allowing a communication section to transmit the read second operation image to the communication device, and to receive, from the communication device, an instruction corresponding to an operation inputted on the second operation image in the communication device; an instruction reception section receiving the instruction received by the communication section besides an instruction corresponding (Continued)

to operation on the first operation image of the display section; and an execution section.

7 Claims, 16 Drawing Sheets

(52) U.S. Cl.
CPC ..... *H04N 1/00469* (2013.01); *H04N 1/00482* (2013.01); *H04N 1/00493* (2013.01); *H04N 1/00506* (2013.01); *H04N 2201/0094* (2013.01)

(58) Field of Classification Search
USPC .......................................................... 358/1.15
See application file for complete search history.

(56) References Cited

FOREIGN PATENT DOCUMENTS

| | | | |
|---|---|---|---|
| JP | 2012-212402 | A | 11/2012 |
| JP | 2013-41519 | A | 2/2013 |
| JP | 2013046379 | A | 3/2013 |
| JP | 2013088506 | A | 5/2013 |
| JP | 2013250849 | A | 12/2013 |
| JP | 2014016941 | A | 1/2014 |

\* cited by examiner

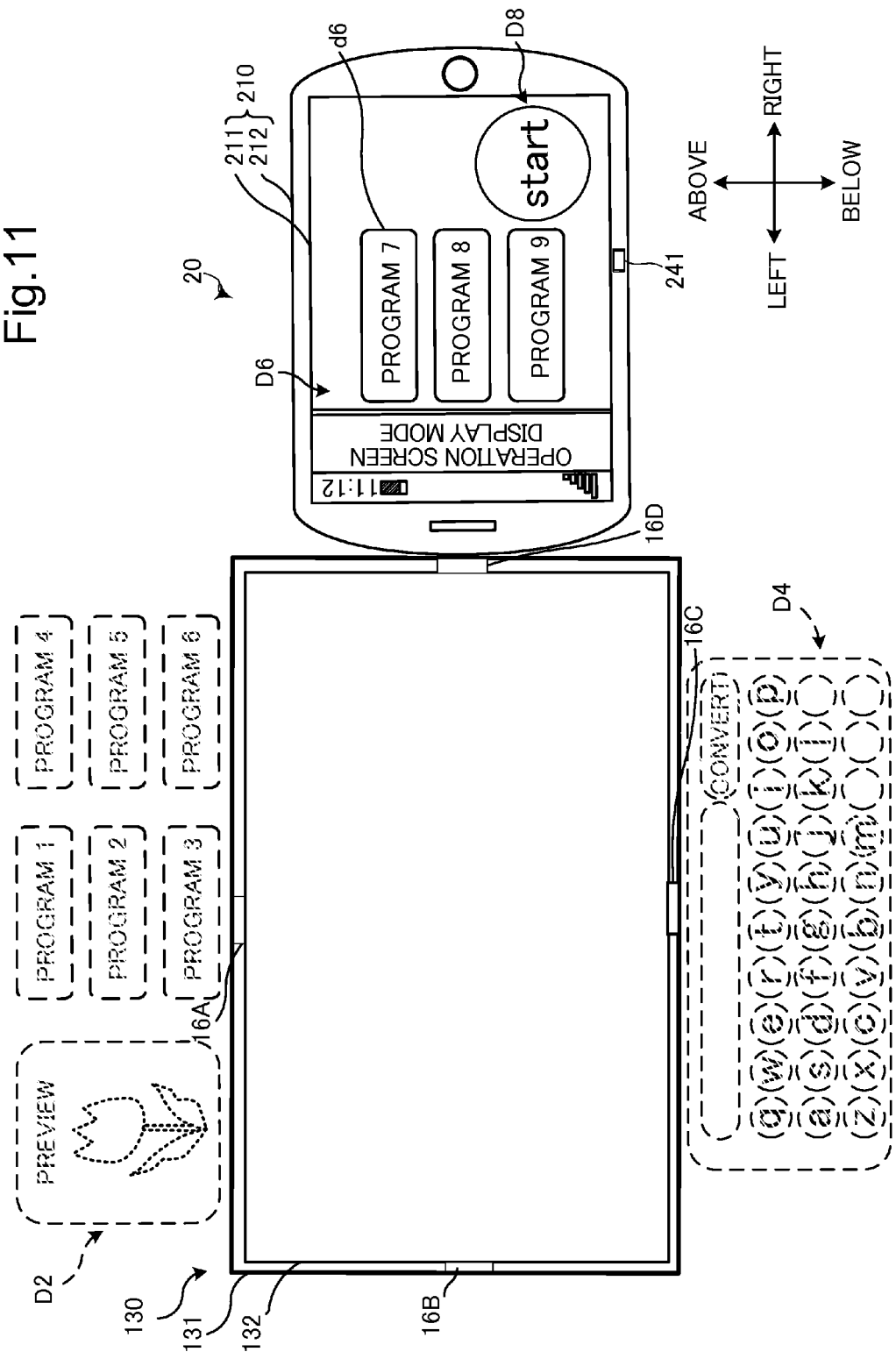

Fig.12A
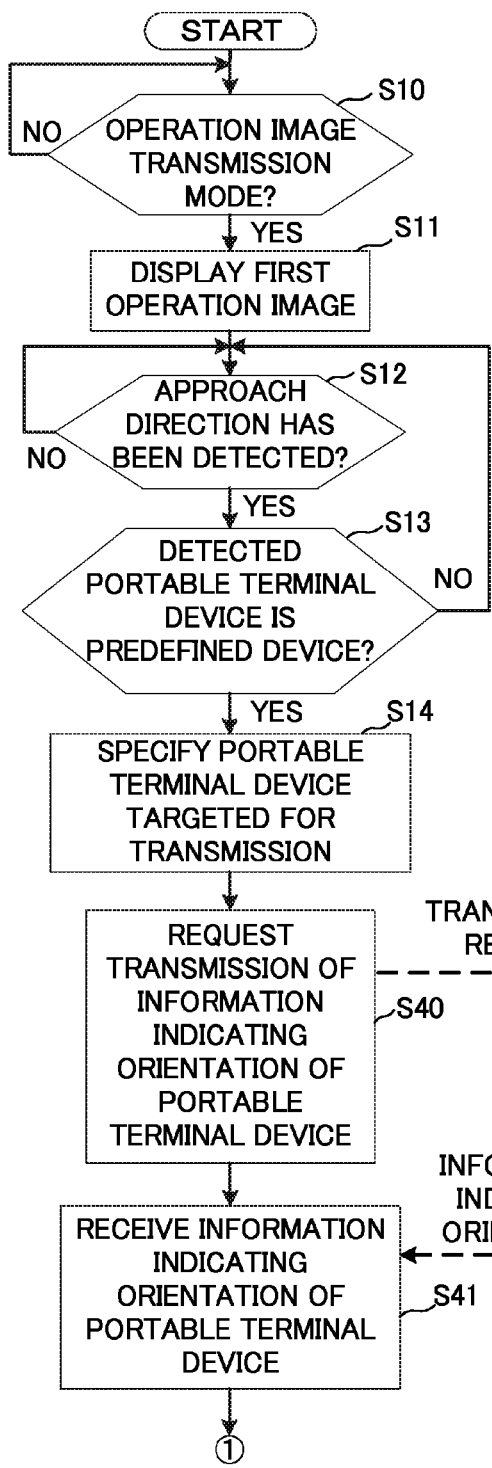
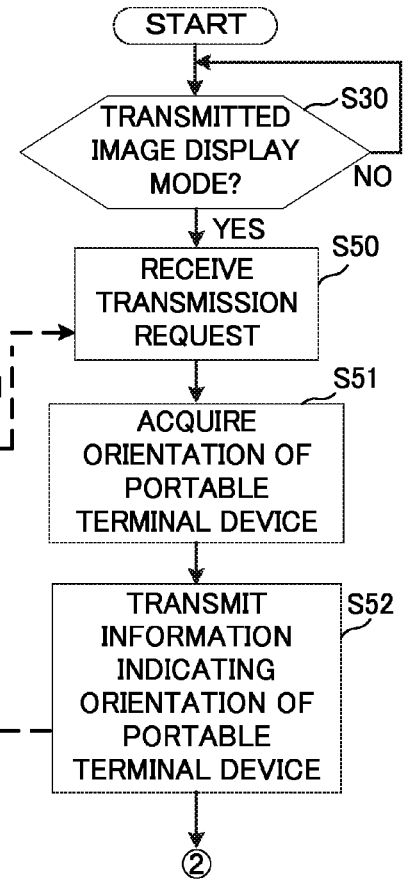

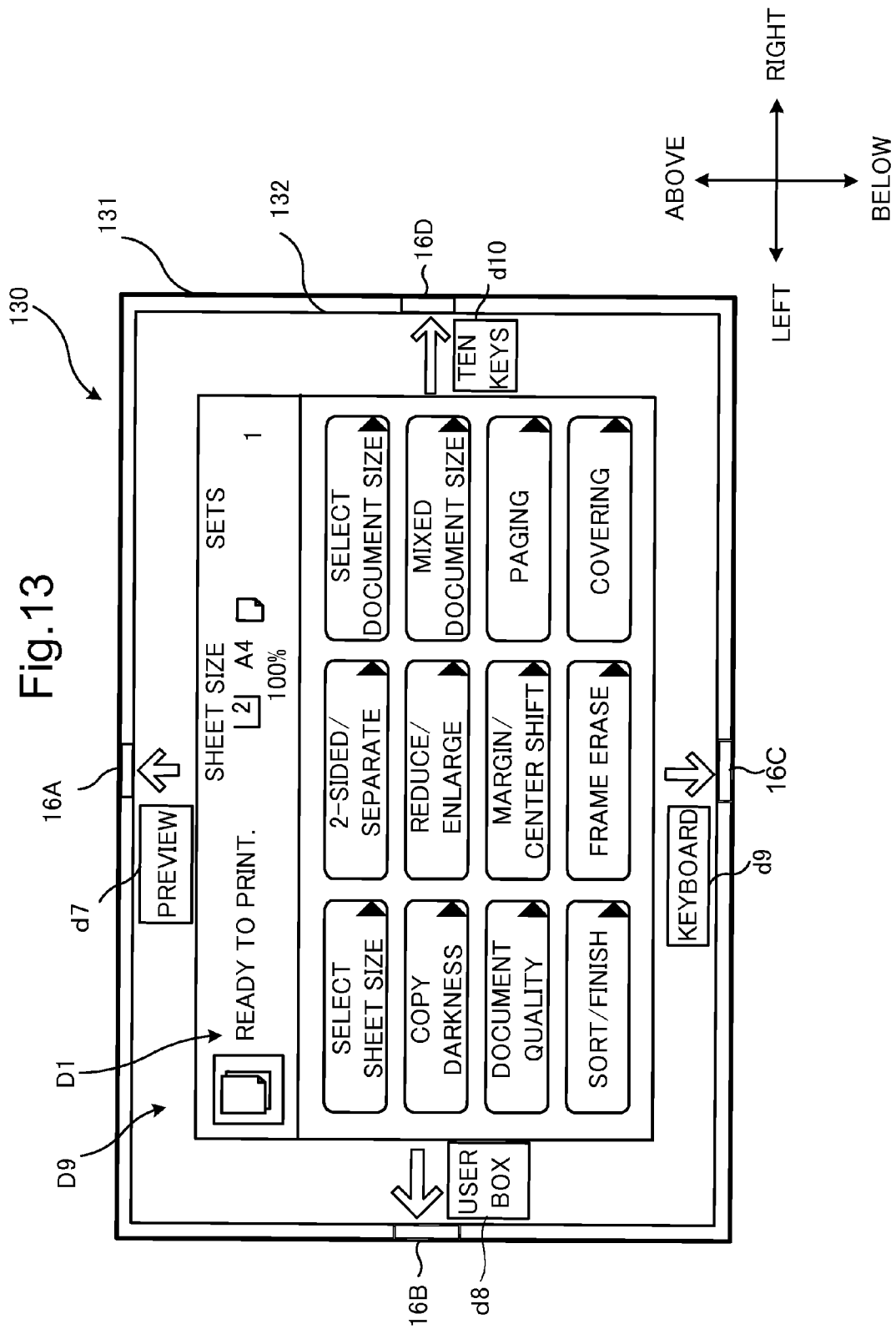

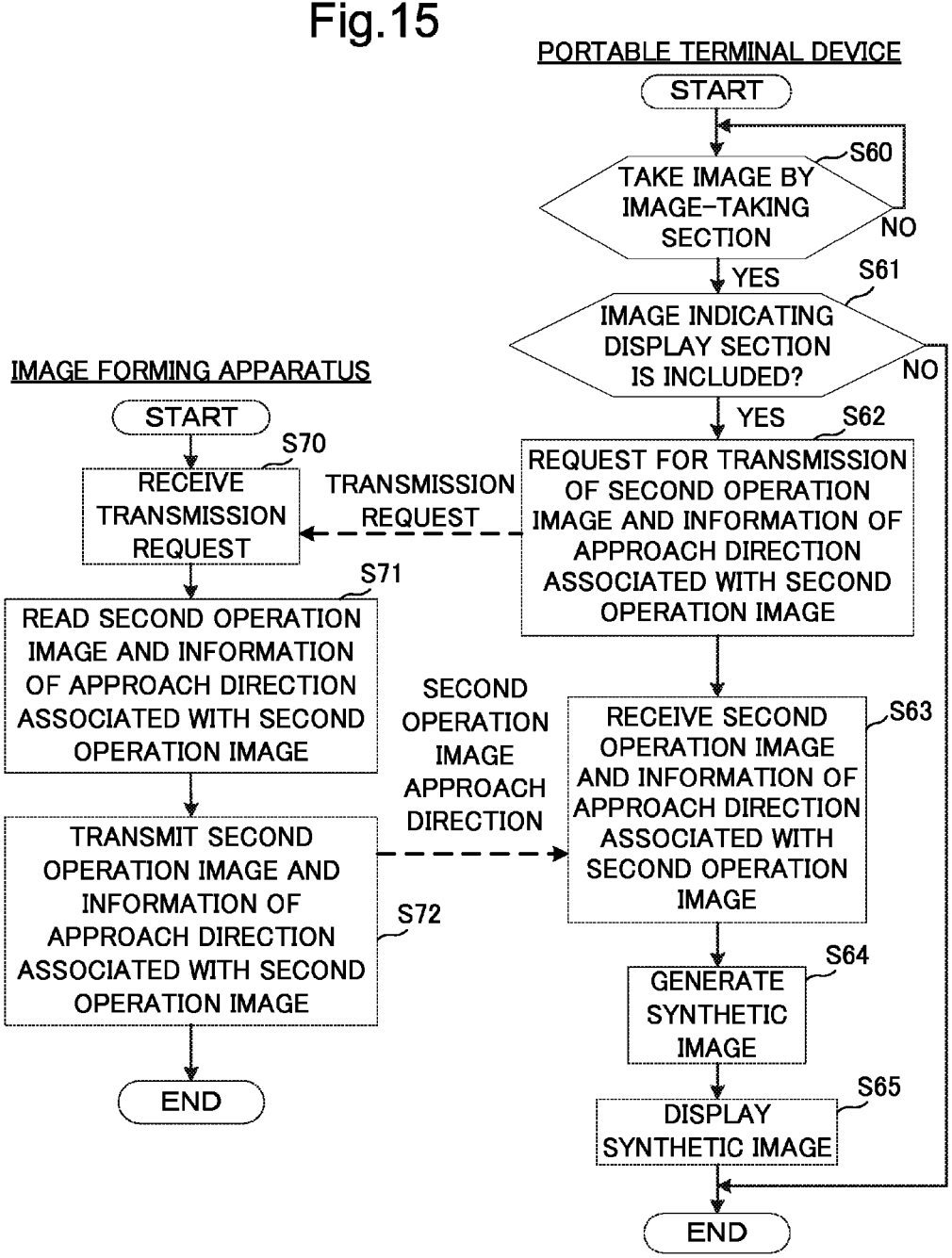

OPERATION SCREEN OF AN IMAGE FORMING APPARATUS BEING DISPLAYED ON A PORTABLE DEVICE BASED ON THE POSITION OF THE PORTABLE DEVICE

INCORPORATION BY REFERENCE

This application claims priority to Japanese Patent Application No. 2014-200949 filed on Sep. 30 2014, the entire disclosure of which are incorporated herein by reference.

BACKGROUND

This disclosure relates to an information processing apparatus, a communication device, and an information processing system, and more specifically to a technology of displaying an operation image provided for user operation.

Background Art

The information processing apparatus such as an image forming apparatus includes a display section displaying an operation image provided for user operation. The user performs, for example, operation of selecting an operation button included in the operation image displayed at the display section whereby various instructions can be inputted to the information processing apparatus.

Also known technology includes, in addition to displaying at the display section of the information processing apparatus, displaying an operation image at a display section of a communication device, such as an external portable terminal device. Using the external portable terminal device as the display section to display the operation image of the information processing apparatus enlarges a display area in which the operation image is displayed, thus improving visibility and operability of the operation image. Moreover, downsizing the display section of the information processing apparatus while ensuring the display area in which the operation image is displayed suppress manufacturing costs of the information processing apparatus.

SUMMARY

As one aspect of this disclosure, a technology obtained by further improving the technology described above is suggested.

An information processing apparatus according to one aspect of this disclosure includes: a display section, a display control section, a detection section, a storage section, a communication section, a communication control section, an instruction reception section, and an execution section. The display section displays a first operation image provided for user operation. The display control section controls display operation performed by the display section. The detection section detects an approach direction of a pre-defined communication device approaching the display section. The storage section stores, in addition to the first operation image displayed at the display section, a plurality of second operation images each associated with the approach direction. The communication section is capable of transmitting and receiving data to and from the communication device. The communication control section reads, from the storage section, the second operation image associated with the approach direction detected by the detection section, and allows the communication section to the read second operation image to the communication device and also to receive, from the communication device, an instruction corresponding to operation on the second operation image inputted in the communication device. The instruction reception section receives, in addition to an instruction corresponding to operation on the first operation image displayed at the display section, the instruction received by the communication section. The execution section executes processing corresponding to the instruction received by the instruction reception section.

Moreover, a communication device according to another aspect of this disclosure includes: a communication section, a communication control section, a display section, a display control section, and an instruction reception section. The communication section is capable of transmitting and receiving data to and from an external information processing apparatus. The communication control section controls communication operation performed by the communication section, wherein the communication control section allows the communication section to receive, from the information processing apparatus, the operation image stored in association with an approach direction of the communication device approaching a display section of the information processing apparatus, among a plurality of operation images stored in the information processing apparatus. The display control section allows a display section to display the operation image received by the communication section. The instruction reception section receives an instruction corresponding to operation on the operation image displayed at the display section. The communication control section allows the communication section to transmit, to the information processing apparatus, the instruction received by the instruction reception section.

An information processing system according to one aspect of this disclosure includes: the information processing apparatus described above; and the communication device described above.

BRIEF DESCRIPTION OF THE DRAWINGS

FIG. 11 is a view showing second operation images displayed at a portable terminal device according to Modified Example in a case where the portable terminal device approaches a display section of the image forming apparatus in a horizontal posture from the right thereof;

FIG. 12A and FIG. 12B are flowchart showing a flow of operation of the image forming apparatus and the portable terminal device according to Modified Example 1;

FIG. 13 is a view showing one example of a display image displayed at a display section in an image forming apparatus according to Modified Example 2;

FIG. 15 is a flowchart showing a flow of operation of an image forming apparatus and the portable terminal device according to Modified Example 3.

DETAILED DESCRIPTION

Figure 1:
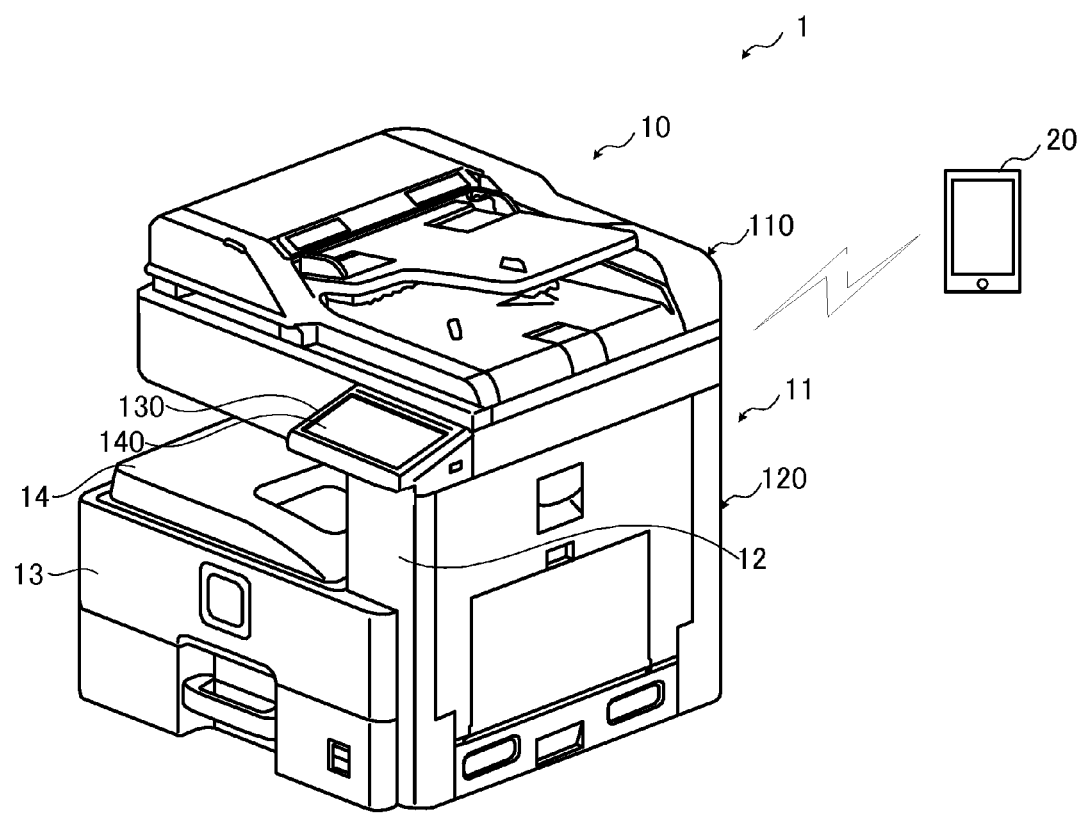
FIG. 1 is a perspective view showing configuration of an information processing system according to one embodiment of this disclosure.
Figure 2:
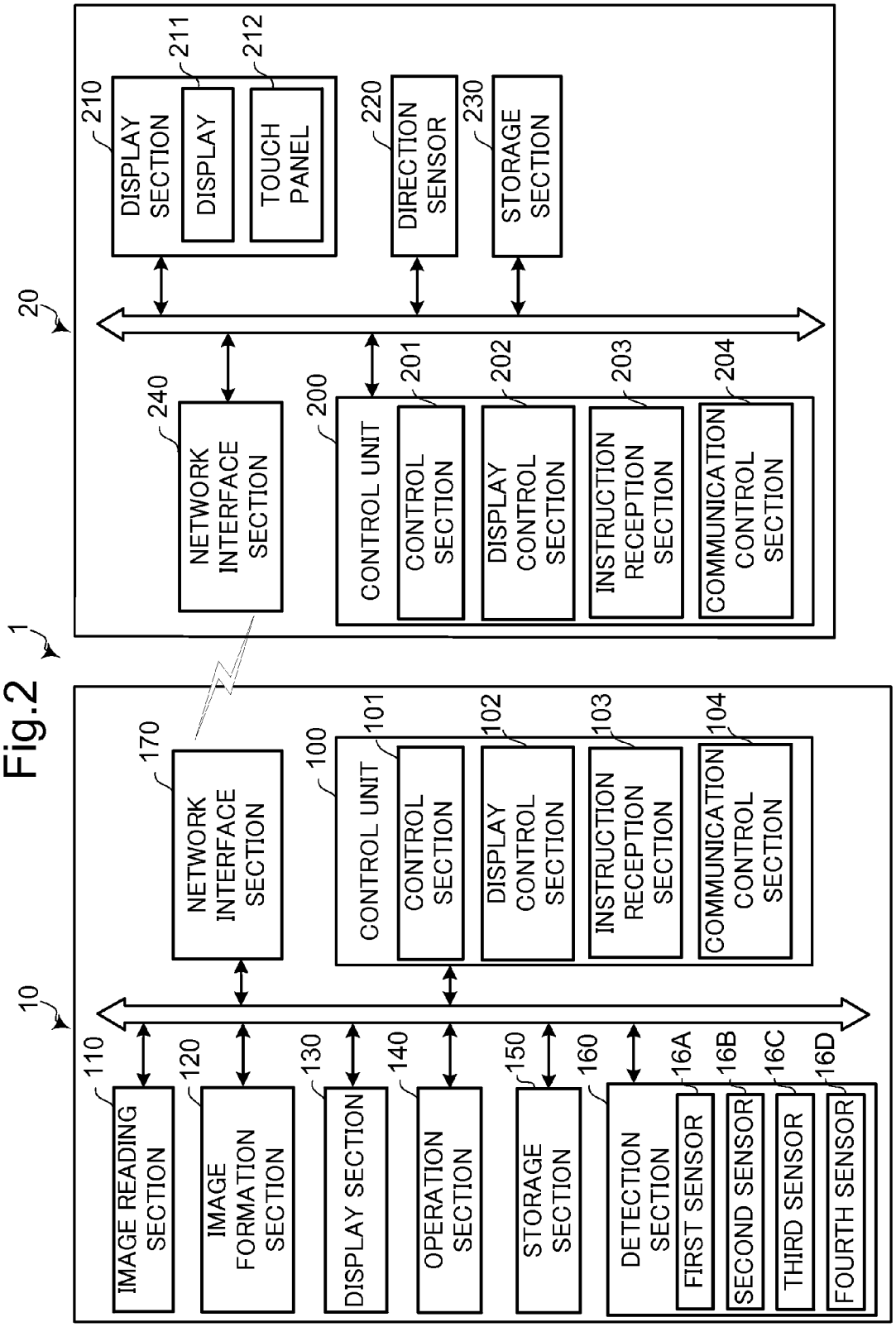
FIG. 2 is a block diagram showing inner configuration of the information processing system according to one embodiment of this disclosure.

Hereinafter, an information processing apparatus, a communication device, and an information processing system according to one embodiment of this disclosure will be described with reference to the drawings. FIG. 1 is a perspective view showing configuration of the information processing system according to one embodiment of this disclosure. FIG. 2 is a block diagram showing inner configuration of the information processing system according to one embodiment of this disclosure.

The information processing system 1 includes: an image forming apparatus 10 as one example of the information processing apparatus; and a portable terminal device 20 as one example of the communication device capable of communicating with the image forming apparatus 10. First, configuration of the image forming apparatus 10 will be described.

The image forming apparatus 10 is a multifunction peripheral combining together a plurality of functions including, for example, a copy function, a printer function, a scanner function, and a facsimile function. The image forming apparatus 10 is schematically composed of an apparatus body 11; an image reading section 110 arranged on a top of the apparatus body 11; and a coupling section 12 provided between the image reading section 110 and the apparatus body 11.

The apparatus body 11 includes: an image formation section 120, a paper feeding section 13; etc.

In image formation operation performed by the image forming apparatus 10, based on, for example, an image read by the image reading section 110, the image formation section 120 (execution section) forms a toner image on recording paper fed from the paper feeding section 13. Then the toner image formed on the recording paper is subjected to thermal fixation by a fixing section, not shown. The recording paper which has been subjected to the fixation processing and on which the image has already been formed is discharged to a discharge tray 14.

Figure 3:
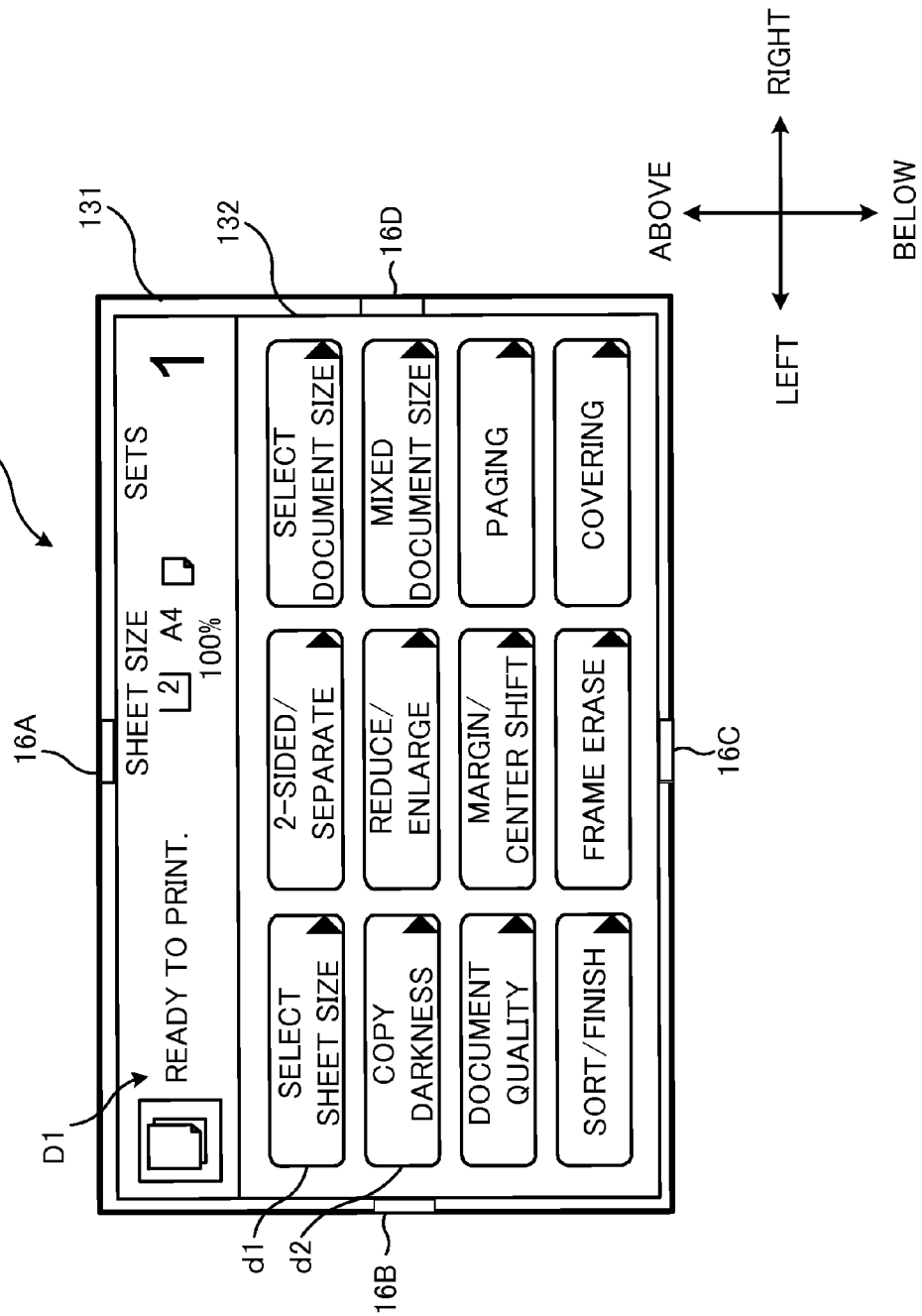
FIG. 3 is an elevation view showing configuration of a display section of an image forming apparatus according to one embodiment of this disclosure.

Arranged on a front surface of a housing forming an outline of the image forming apparatus 10 is a display section 130. FIG. 3 is an elevation view showing configuration of the display section 130. The display section 130 is composed of a display part 132 and a housing part 131 storing the display part 132. The display part 132 includes a liquid crystal display (LCD), or an organic EL {organic light-emitting diode (OLED)} display, and displays, for example, a first operation image D1 provided for operation performed by the user. The first operation image D1 includes a plurality of instruction buttons associated with instructions related to image formation and image reading. For example, as shown in an example of FIG. 3, the first operation image D1 is provided with: a paper select button d1 associated with the instruction for selecting recording paper targeted for the image formation; a copy concentration button d2 associated with the instruction for selecting copy concentration; etc.

Provided at four end parts of the housing part 131 are NFC (Near Field Communication) readers 16A, 16B, 16C, and 16D as approach detection sensors which detect whether or not a predefined portable terminal device 20 is located within a predefined distance. The NFC reader 16A is installed with its detection direction being "from above", the NFC reader 16B is installed with its detection direction being "from the left", the NFC reader 16C is installed with its detection direction being "from below", and the NFC reader 16D is installed with its detection direction being "from the right". A detection section 160 can specify from which one of the NFC readers 16A, 16B, 16C, and 16D a detection signal is outputted, and thereby detect an approach direction in which the portable terminal device 20 approaches the display section 130. For example, if the detection signal is outputted from the NFC reader 16A, the detection section 160 detects that the portable terminal device 20 approaches the display section 130 from there-above.

Note that the NFC readers 16A, 16B, 16C, and 16D have the same configuration except for their arrangement positions. Thus, in the following, when the description is given separately for each NFC reader, numeral 16 is expressed with, for example, "A" or "B" added at its end, and when the description is given not separately for each NFC reader, just "NFC reader 16" is expressed without, for example, "A" or "B" added at its end.

Figure 4:
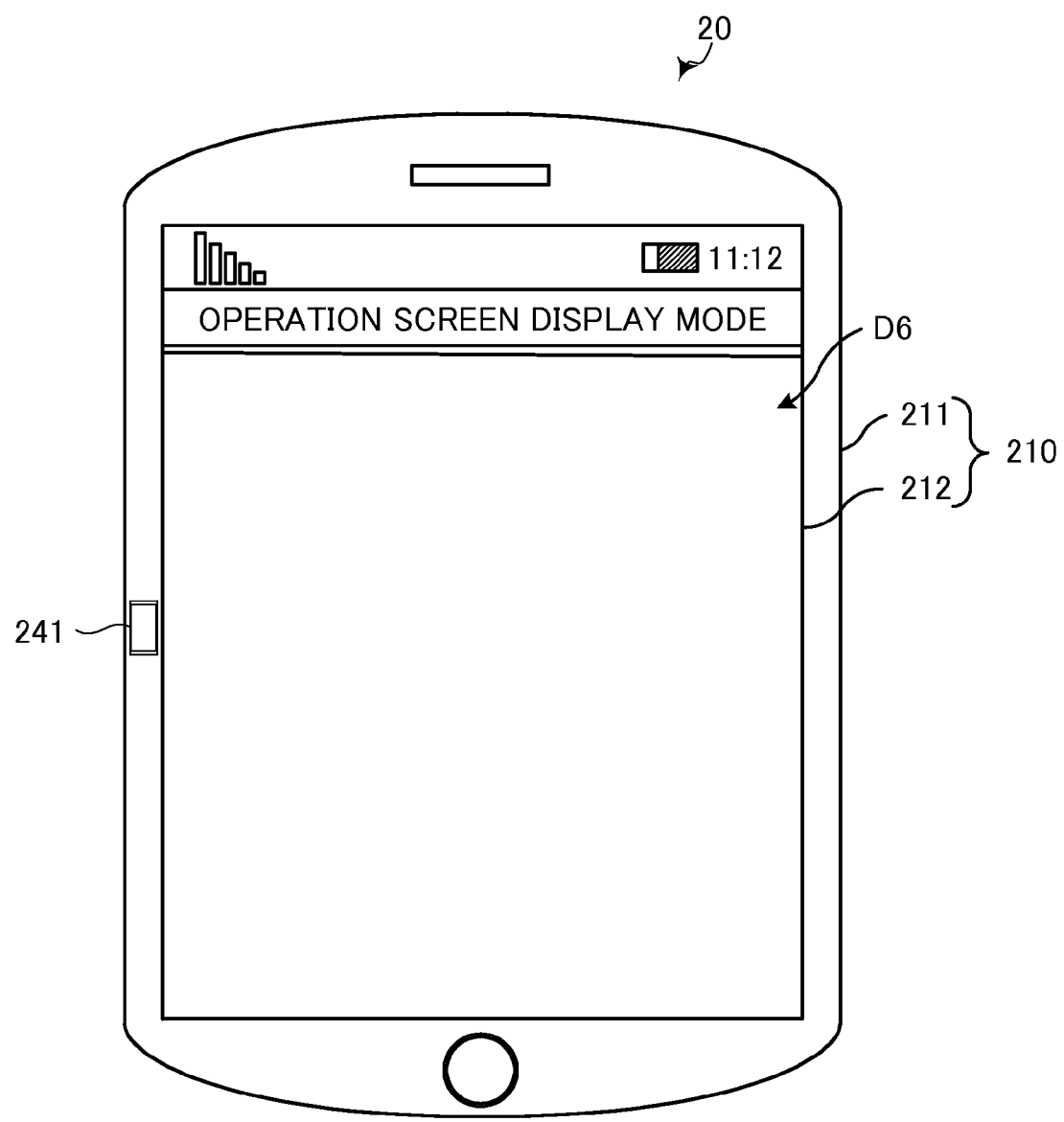
FIG. 4 is an elevation view showing configuration of a portable terminal device according to one embodiment of this disclosure.

The NFC reader 16 includes an NFC coil, not shown, which performs data transmission and reception to and from an NFC tag 241 (see FIG. 4) as a detected section provided in the portable terminal device 20. Upon approach of the portable terminal device 20 to the NFC reader 16, through electromagnetic induction between an antenna coil (not shown) built in the NFC tag 241 of the portable terminal device 20 and the NFC coil built in the NFC reader 16, electric power is supplied to the antenna coil of the NFC tag 241. The NFC tag 241, by using this supplied electric power, transmits, to the NFC reader 16, an identification number specific to the portable terminal device 20 and an MAC address (address information) of the portable terminal device 20, which are stored in a memory of the NFC tag 241.

The detection section 160 receives the aforementioned identification number and information indicating the MAC address via the NFC reader 16. The detection section 160, by using the received identification number, determines whether or not the portable terminal device 20 approaching the NFC reader 16 is a predefined device. In a storage section 150, an identification number for identifying a device permitted for transmission of an operation image is previously stored. If the received identification number agrees with the identification number stored in the storage section 150, the detection section 160 determines that the portable terminal device 20 approaching the NFC reader 16 is the predefined device. This permits the detection section 160 to detect an approach direction in which the predefined portable terminal device 20 permitted for the transmission of the operation image approaches the display section 130.

The storage section 150 is a large-capacity storage device such as an HDD (Hard Disk Drive).

A network interface section 170 (communication section) is formed of a communication module such as a wireless LAN board. This network interface section 170 is controlled by a communication control section 104 to be described later on.

The image forming apparatus 10 further includes a control unit 100. The control unit 100 is composed of: a CPU (Central Processing Unit), a RAM, a ROM, etc. As a result of execution of an information processing program stored in the aforementioned ROM or the storage section 150 by the aforementioned CPU, the control unit 100 functions as a control section 101, a display control section 102, an instruction reception section 103, and a communication control section 104. Note that the control section 101, the display control section 102, the instruction reception section 103, and the communication control section 104 of the control unit 100 may each be formed of a hard circuit without depending on operation based on the image processing program.

The control section 101 is responsible for overall operation control of the image forming apparatus 10. The control section 101 is connected to the image reading section 110, the image formation section 120, the display section 130, the operation section 140, the storage section 150, the detection section 160, the network interface section 170, etc. The control section 101 performs operation control of each of the connected mechanisms described above and performs signal or data transmission and reception to and from each mechanism.

The display control section 102 has a function of controlling display operation performed by the display section 130.

The instruction reception section 103 has a function of receiving an instruction corresponding to operation on the first operation image displayed at the display section 130. Moreover, the instruction reception section 103 has a function of receiving an instruction inputted at the portable terminal device 20, which will be described in detail later on.

The communication control section 104 has a function of controlling the network interface section 170 to perform data transmission and reception to and from, for example, the portable terminal device 20. More specifically, the communication control section 104 uses the MAC address of the portable terminal device 20 acquired from the NFC tag 241 by the detection section 160 to establish a path for communication with the portable terminal device 20. Then the communication control section 104 reads, from the storage section 150, second operation images D2 to D5 (see FIG. 5) which are different from the first operation image D1, and allows the network interface section 170 to transmit any one of the read second operation images D2 to D5 to the portable terminal device 20.

Subsequently, configuration of the portable terminal device 20 will be described. The portable terminal device 20 is a portable mobile device, such as a smart phone, including a control unit 200, a display section 210, an orientation sensor 220, a storage section 230, a network interface section 240 (communication section), etc.

The network interface section 240 is composed of a communication module such as a wireless LAN chip. This network interface section 240 is controlled by a communication control section 204 to be described later on.

The display section 210 has: a display 211 (display section) composed of, for example, a liquid crystal display or an organic EL display; and a touch panel 212 arranged on a front surface of a display screen portion of the display 211.

The portable terminal device 20 has an operation mode (operation image display mode) in which the display 211 displays the second operation image transmitted from the image forming apparatus 10. In this operation image display mode, under control by a display control section 202 to be described later on, the display 211 displays a display image D6 shown in FIG. 4. Then upon reception of the second operation image transmitted from the image forming apparatus 10 by the network interface section 240, the display 211 displays this second operation image on a blank portion of the display image D6. The display 211 is a display having higher luminance, higher resolution, and higher response speed than a display of the display section 130 loaded in the image forming apparatus 10.

The touch panel 212 plays a role as an operation section which receives operation on the second operation image displayed on the display 211.

The orientation sensor 220 is a so-called gyro sensor, which detects orientation of the portable terminal device 20. Upon the detection of the orientation of the portable terminal device 20, the orientation sensor 220 outputs a detection signal indicating this detected orientation to, for example, the communication control section 204 of the control unit 200 to be described later on.

The storage section 230 is a large-capacity storage device such as an HDD (Hard Disk Drive).

The control unit 200 is composed of a CPU, a RAM. a ROM, etc. The control unit 200 functions as the control section 201, the display control section 202, the instruction reception section 203, and the communication control section 204 as a result of execution of a portable terminal device control program stored in the ROM or storage section 230 described above by the CPU described above. Note that the control section 201, the display control section 202, the instruction reception section 203, and the communication control section 204 of the control unit 200 may be each formed of a hard circuit without depending on operation based on the portable terminal device control program described above.

The control section 201 is responsible for overall operation control of the portable terminal device 20. The control section 201 is connected to the display section 210, the orientation sensor 220, the storage section 230, the network interface section 240, etc. The control section 201 performs operation control of each of the connected mechanisms described above and performs signal or data transmission and reception to and from each mechanism.

The display control section 202 has a function of controlling display operation performed by the display 211.

The communication control section 204 controls the network interface section 240 to perform data transmission and reception to and from the image forming apparatus 10. The communication control section 204 has a function of receiving the second operation image transmitted from the image forming apparatus 10. Moreover, the communication control section 204 has a function of controlling the network interface section 240 to transmit, to the image forming apparatus 10, an instruction corresponding to operation on the second operation image received by the instruction reception section 203 to be described later on.

The instruction reception section 203 specifies user operation inputted by the user based on a detection signal outputted from the touch panel 212. Then the instruction reception section 203 receives an instruction corresponding to operation on the second operation image displayed at the display section 130.

Subsequently, with reference to FIGS. 5 to 8, the information processing system 1 provided with the configuration described above will be described in more detail.

Figure 5:
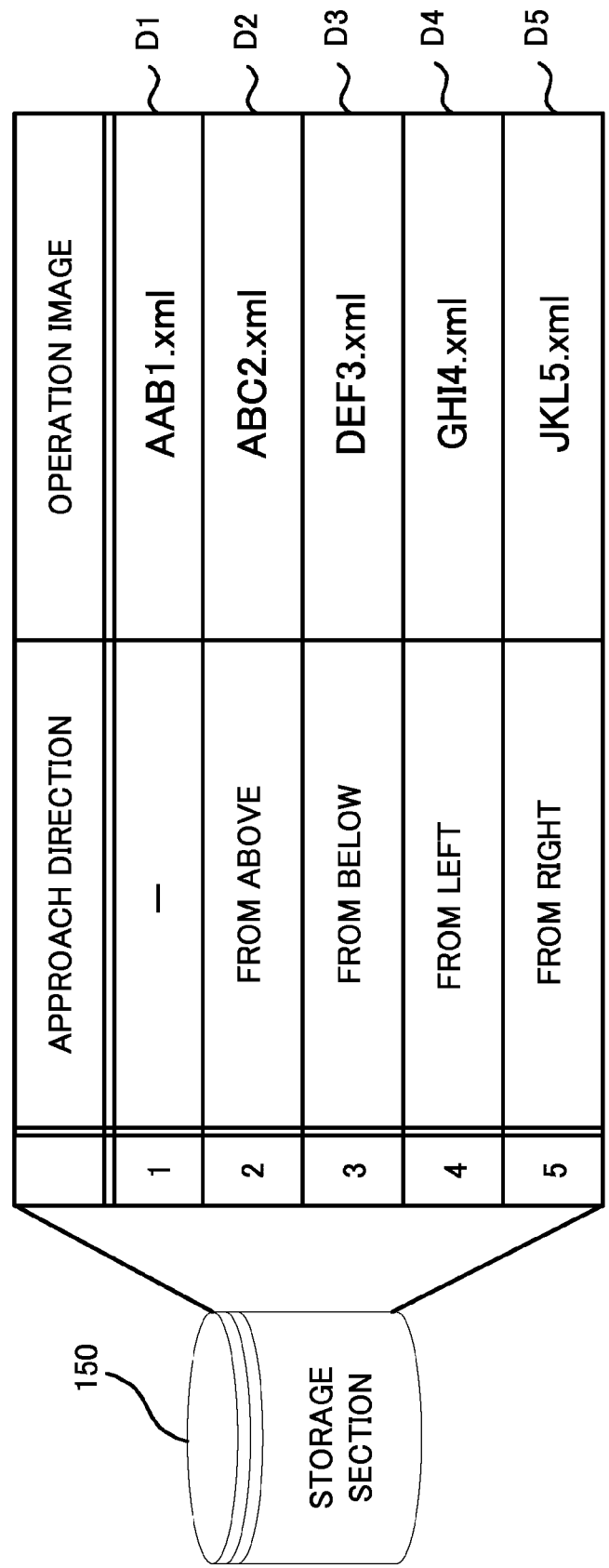
FIG. 5 is an elevation view showing contents of data stored in a storage section of the image forming apparatus according to one embodiment of this disclosure.

FIG. 5 is a view showing contents of data stored in the storage section 150. As shown in this figure, in the storage section 150, the first operation image D1 and the second operation images D2 to D5 are stored. The second operation images D2 to D5 are each stored in the storage section 150 in association with the approach direction in which the portable terminal device 20 approaches the display section 130. In an example shown in FIG. 5, the second operation images D2 to D5 are in association with any of directions "from above", "from below", "on the right of", and "on the left of" the display section 130.

Figure 6:
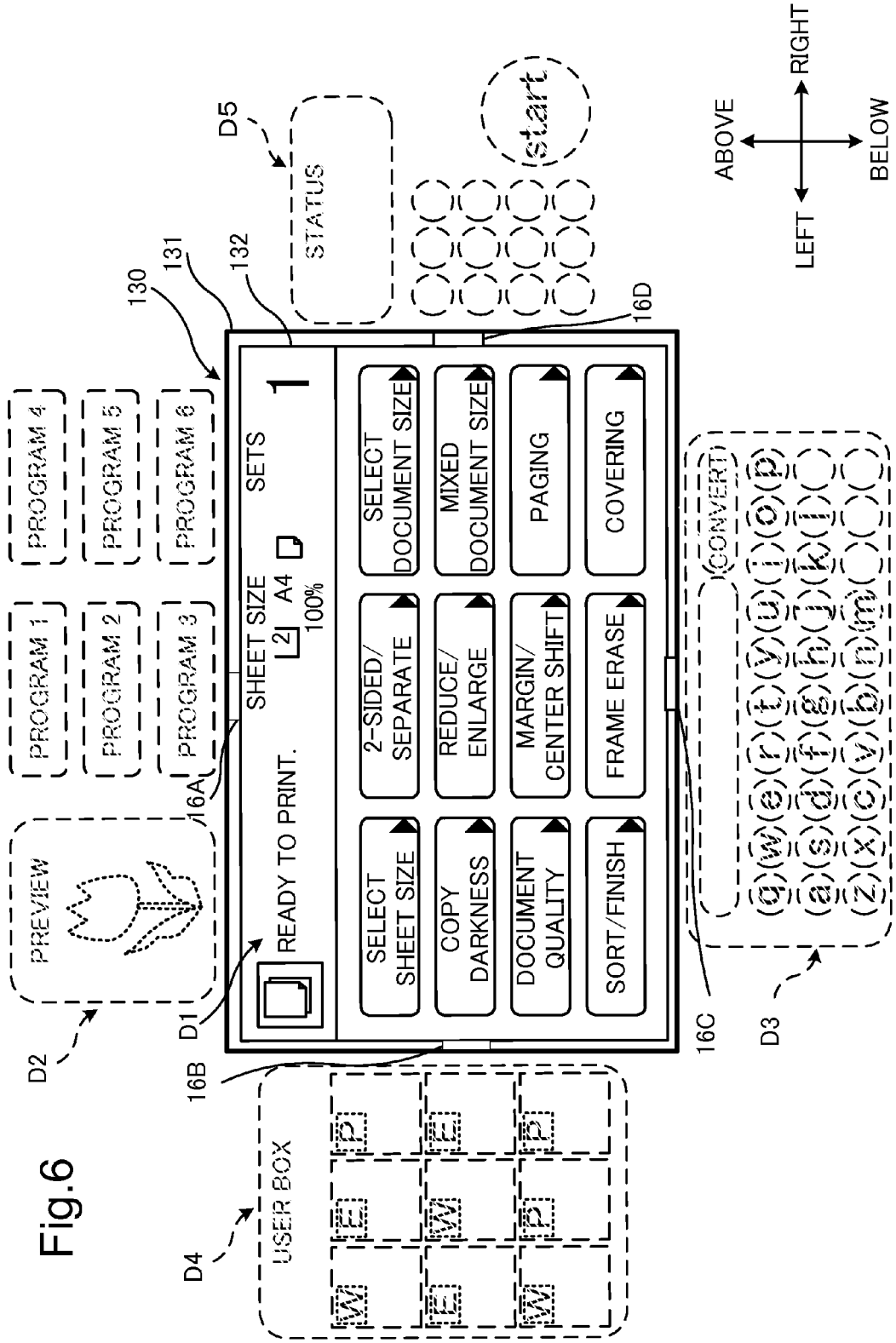
FIG. 6 is a view in which second operation images displayed at the portable terminal device according to one embodiment of this disclosure are virtually arranged above, below, on the right of, and on the left of a display section of the image forming apparatus.
Figure 7:
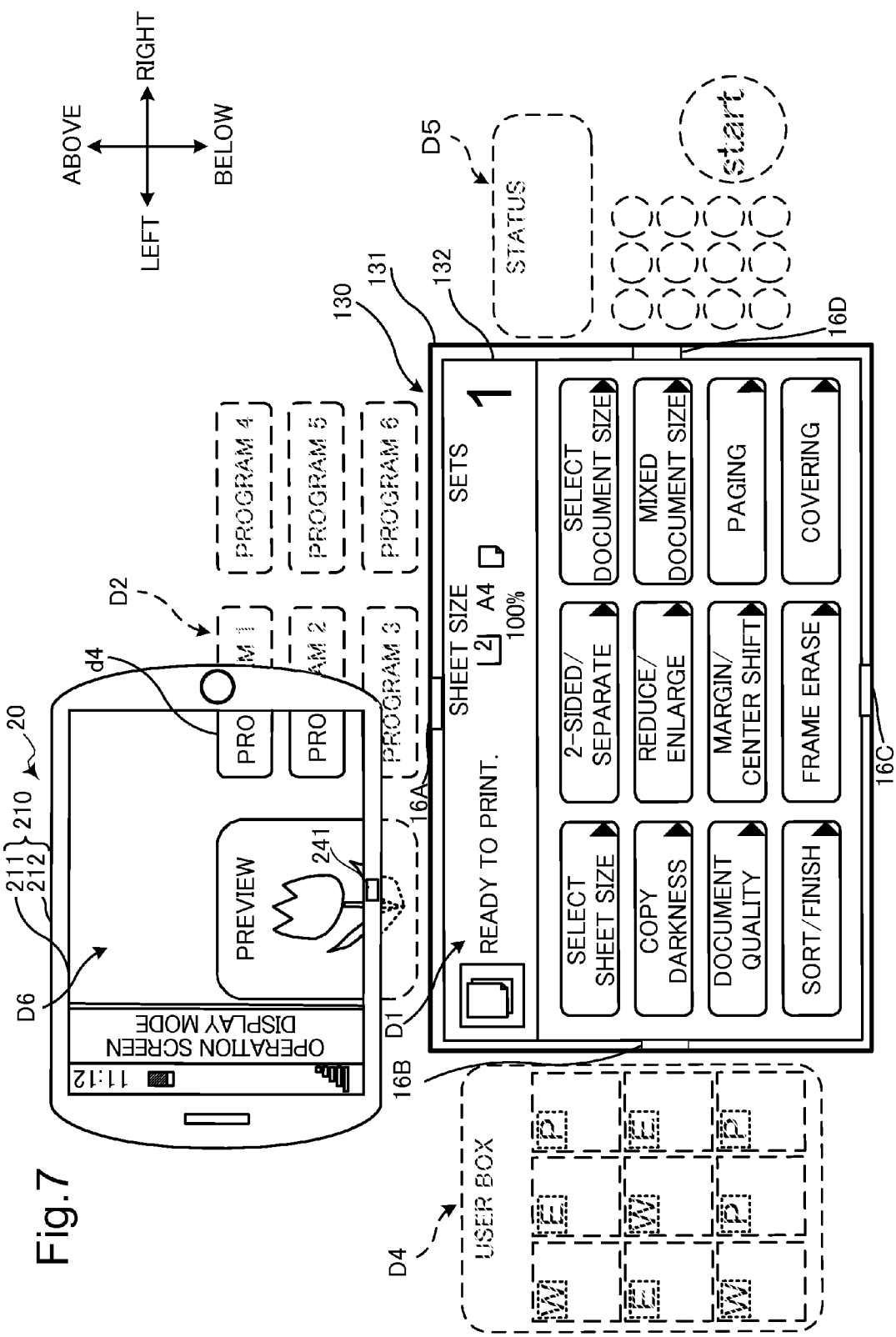
FIG. 7 is a view showing the second operation images displayed at the portable terminal device in a case where the portable terminal device according to one embodiment of this disclosure approaches the display section of the image forming apparatus from thereabove.

In the image forming apparatus 10 according to this embodiment, in order for the portable terminal device 20 to display the second operation images D2 to D5 each associated with the approach direction in which the portable terminal device 20 approaches the display section 130, it can be assumed that the second operation images D2 to D5 as shown by broken lines of FIG. 6 are virtually arranged in spaces above, below, on the right, and on the left of the display section 130. Then as a result of positioning the portable terminal device 20 in the spaces above, below, on the right of, and on the left of the display section 130, the virtually arranged second operation imagesD2 to D5 are displayed on the display 211 of the portable terminal device 20. For example, in a case where the portable terminal device 20 makes an approach from above the display section 130, as shown in FIG. 7, displayed on the display 211 of the portable terminal device 20 is, for example, an image on which the second operation image D2 is displayed on a blank portion of the display image D6. Provided on the second operation image D2 is, for example, a program button d4 associated with a print job program 1 in which copy concentration and an original copy size are set. In a case where the user makes operation of selecting this program button d4, the instruction reception section 203 receives an instruction for executing the print job program 1.

Moreover, provided on the second operation image D2 is a preview screen displaying an image targeted for image formation. The display 211 of the portable terminal device 20 is a display having higher resolution than the display of the display section 130 loaded in the image forming apparatus 10, and thus image visibility can be improved not by displaying, on the display section 130 on an image forming apparatus 10 side, an image such as the preview screen for which higher image quality is more preferable, but by displaying it on the display 211 on a portable terminal device 20 side.

Figure 8:
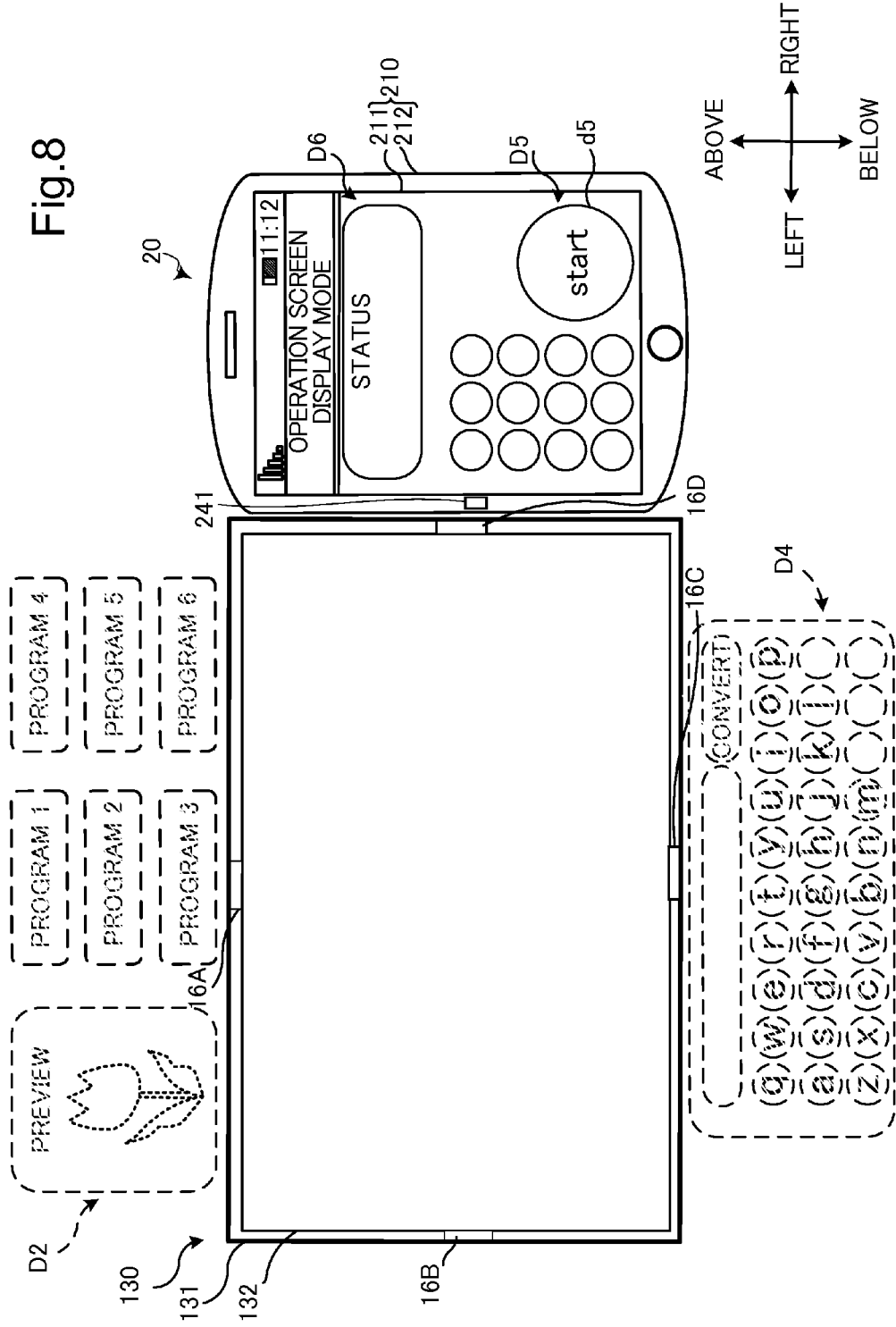
FIG. 8 is a view showing the second operation images displayed at the portable terminal device in a case where the portable terminal device according to one embodiment of this disclosure approaches the display section of the image forming apparatus from the right thereof.

Moreover, for example, in a case where the portable terminal device 20 makes an approach from the right of the display section 130, as shown in FIG. 8, displayed on the display 211 of the portable terminal device 20 is an image in which the second operation image D5 is displayed in the blank portion of the display image D6. Provided on the second operation image D5 is, for example, a start button d5 as an instruction button associated with execution start instructions for image reading processing for the image reading section 110 and image formation processing for the image formation section 120. In a case where the user performs operation of selecting this start button d5, the instruction reception section 203 receives the execution start instructions for the image reading processing and the image formation processing.

Here, stored in the storage section 150 for each of the second operation images D2 to D5 is a switch-off flag indicating whether or not to stop the display operation performed by the display section 130 upon the display of the second operation images D2 to D5. For example, for the operation image, like the second operation image D5 described above, which includes the instruction button associated with the execution start instructions for the image reading processing for the image reading section 110 and the image formation processing for the image formation section 120, this switch-off flag is stored. When the portable terminal device 20 displays the second operation image for which the switch-off flag is stored, the display control section 102 stops the display operation performed by the display section 130. In a case where the operation image such as the second operation image D5 is displayed on the portable terminal device 20 side, even without displaying, for example, the first operation image D1 on the image forming apparatus 10 side, it is possible for the user to instruct the image reading processing or the image formation processing. Thus, stopping the display operation performed by the display section 130 can suppress power consumption of the image forming apparatus 10.

Simply, a technology of displaying the operation image of the information processing apparatus such as the image forming apparatus on the portable terminal device side can increase a display area in which the operation image can be displayed, but this increased area is limited to an area of the display section of the portable terminal device. On the contrary, in the image forming apparatus 10 and the portable terminal device 20 according to this embodiment, as shown in FIGS. 6 to 8, it is possible to display the operation image in the space above, below, on the right of, or on the left of the display section 130, which can increase the display area in which the operation image can be displayed.

Moreover, with the technology of simply displaying the operation image of the information processing apparatus such as the image forming apparatus on the portable terminal device side, the operation images displayed on the portable terminal device are limited to those specified on the information processing apparatus side, and thus the user possessing the portable terminal device cannot display a desired operation image in the portable terminal device to perform operation. On the contrary, in the image forming apparatus 10 and the portable terminal device 20 according to this embodiment, the operation image associated with the approach direction in which the display section 130 is approached is displayed on the portable terminal device 20, and thus by performing operation of allowing the portable terminal device 20 to approach the display section 130, the user possessing the portable terminal device 20 can operate the image forming apparatus 10 by using the desired operation image.

Figure 9:
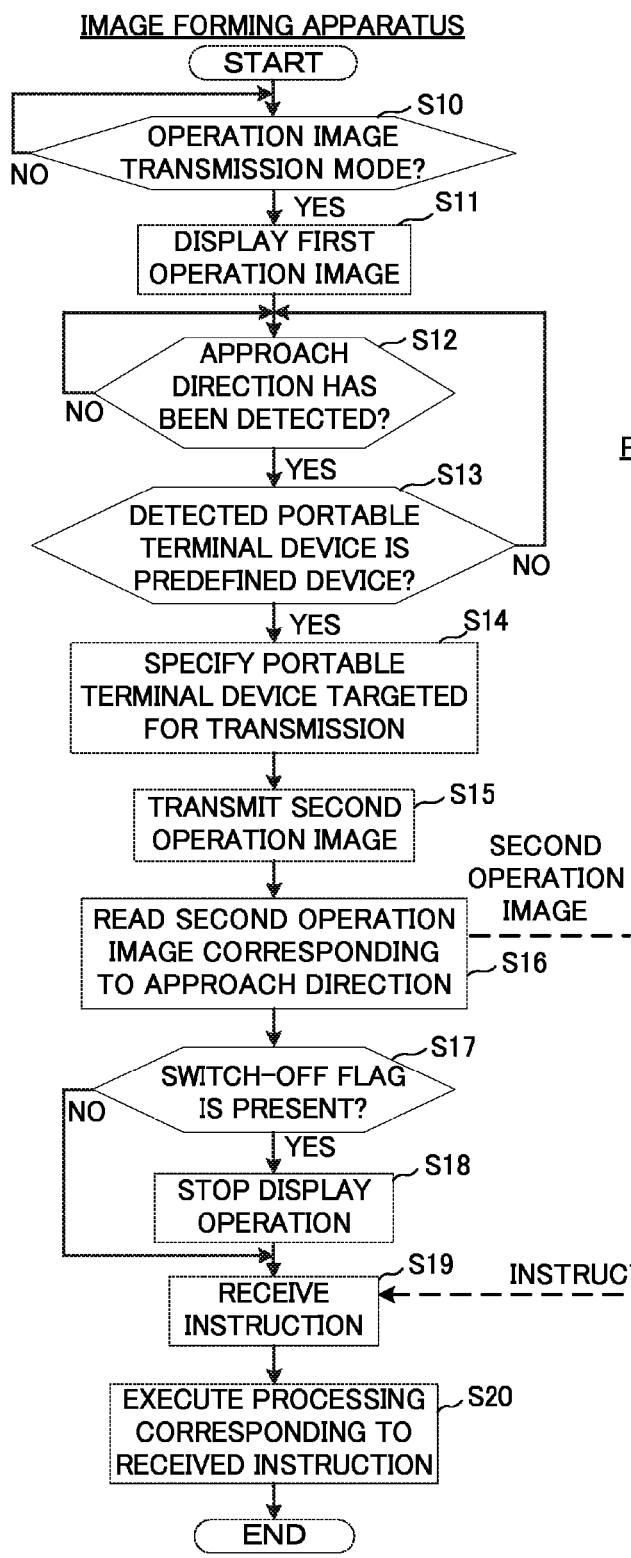
FIG. 9 is a flowchart showing a flow of operation of the image forming apparatus and the portable terminal device according to one embodiment of this disclosure.

Subsequently, operation of the image forming apparatus 10 and the portable terminal device 20 provided with the configuration described above will be described. FIG. 9 is a flowchart showing a flow of the operation of the image forming apparatus 10 and the portable terminal device 20.

As shown in FIG. 9, the control section 101 of the image forming apparatus 10 determines whether or not an operation mode of the image forming apparatus 10 is an operation image transmission mode for transmitting the operation image to the portable terminal device 20 (step S10). If the display section 130 has received an instruction for transition to the operation image transmission mode based on user operation using, for example, the operation section 140, the control section 101 switches the operation mode of the image forming apparatus 10 to the operation image transmission mode.

If the operation mode is the operation image transmission mode (YES in step S10), the display control section 102 reads the first operation image from the storage section 150, and allows the display section 130 to display the read first operation image (step S11).

After the processing of step S11, the detection section 160 determines whether or not the approach direction in which the portable terminal device 20 approaches the display section 130 has been detected (step S12).

If the approach direction has been detected (YES in step 12), the detection section 160 receives, via the NFC reader 16, the identification number and the information indicating the MAC address stored in the memory of the NFC tag 241. Then the detection section 160 uses the received identification number to determine whether or not the portable terminal device 20 approaching the display section 130 is the predefined device (Step S13).

If the portable terminal device 20 approaching the display section 130 is not the predefined device (NO in step S13), the processing returns to step S12. On the other hand, if the portable terminal device 20 approaching the display section 130 is the predefined device (YES in step S13), the communication control section 104 uses the MAC address received by the detection section 160 in the processing of step S13 to specify the portable terminal device 20 targeted for transmission of the second operation image (step S14).

Then the communication control section 104 reads, from the storage section 150, the second operation image associated with to the approach direction detected by the detection section 160 in the processing of step S12 (step S15), and allows the network interface section 170 to transmit the read second operation image towards the portable terminal device 20 (step S16).

After the transmission of the second operation image, the display control section 102 refers to the data stored in the storage section 150 to determine whether or not the switch-off flag is stored for the second operation image transmitted in the processing of step S16 (step S17). If the switch-off flag is stored (YES in step S17), the display control section 102 stops the image display operation performed by the display section 130 (step S18).

Then the communication control section 104 allows the network interface section 170 to receive, from the portable terminal device 20, an instruction corresponding to operation on the second operation image inputted in the portable terminal device 20 (step S19).

Execution sections such as the image reading section 110 and the image formation section 120 execute the image reading processing and the image formation processing corresponding to the instruction received in step S19 (step S20).

On the other hand, the display control section 201 of the portable terminal device 20 determines whether or not the operation mode of the portable terminal device 20 is the operation image display mode for displaying the operation image transmitted from the image forming apparatus 10 (step S30). If the instruction reception section 203 has received the instruction for the transition to the operation image display mode based on user operation by use of, for example, the touch panel 212, the display control section 201 switches the operation mode of the portable terminal device 20 to the operation image display mode.

If the operation mode is the operation image display mode (YES in step S30), the communication control section 204 allows the network interface section 240 to receive the second operation image transmitted from the image forming apparatus 10 (step S31).

Then the display control section 202 allows the display 211 to display the second operation image received in the processing of step S31 (step S32).

After the second operation image was displayed, when the instruction reception section 203 has received the instruction corresponding to the operation on the second operation image (YES in step S33), the communication control section 204 allows the network interface section 240 to transmit this received instruction towards the image forming apparatus 10 (step S34).

<Comments>

Note that the detection section 160 can detect not only the approach direction in which the portable terminal device 20 approaches the display section 130 but also a position of the portable terminal device 20. Due to disproportional relationship between intensity of the detection signals outputted from the NFC readers 16A, 16B, 16C, and 16D and a distance between the portable terminal device 20 and the NFC readers 16A, 16B, 16C, and 16D, based on the intensity of the detection signals outputted from the NFC readers 16A, 16B, 16C, and 16D, the detection section 160 can detect the position of the portable terminal device 20 with respect to the display section 130 as a reference position.

As described above, in a case where the detection section 160 detects the position of the portable terminal device 20 in addition to the approach direction of the portable terminal device 20, in the processing of step S16 shown in FIG. 9, the communication control section 104 allows the network interface section 170 to transmit, towards the portable terminal device 20, position information of the portable terminal device 20 with respect to the display section 130 as the reference position, in addition to the second operation image.

On the portable terminal device 20 side, in processing of step S31 shown in FIG. 9, the communication control section 204 allows the network interface section 240 to receive the second operation image and the position information of the portable terminal device 20 transmitted from the image forming apparatus 10.

Then the display control section 202 does not allows the display 211 to simply display an entire range of the second operation image received in the processing of step S31 but allows the display 211 to display part of the second operation image in a range specified by the position information of the portable terminal device 20. For example, in a case where the portable terminal device 20 is located at a distance X from above the NFC reader 16A (shown in FIG. 7), the display control section 202 allows the display 211 to display an image excluding a range located at a distance Y, corresponding to the distance X, from above a lower end of the second operation image (see FIG. 7).

In a case where the position of the portable terminal device 20 detected by the detection section 160 has changed, the communication control section 104 allows the network interface section 170 to transmit the changed position information of the portable terminal device 20 towards the portable terminal device 20. The display control section 202, based on this changed position information of the portable terminal device 20 transmitted from the image forming apparatus 10, changes the range of the second operation image to be displayed on the display 211.

This disclosure is not limited to the configuration of the embodiment described above, and thus various modifications thereto can be made.

Modified Example 1

Described in the embodiment above is a case where the image forming apparatus 10 transmits, to the portable terminal device 20, the second operation image associated with the approach direction of the portable terminal device 20. On the contrary, in an image forming apparatus 10 according to Modified Example 1, a second operation image associated with a combination of an approach direction of a portable terminal device 20 and orientation of the portable terminal device 20 is transmitted to the portable terminal device 20.

Figure 10:
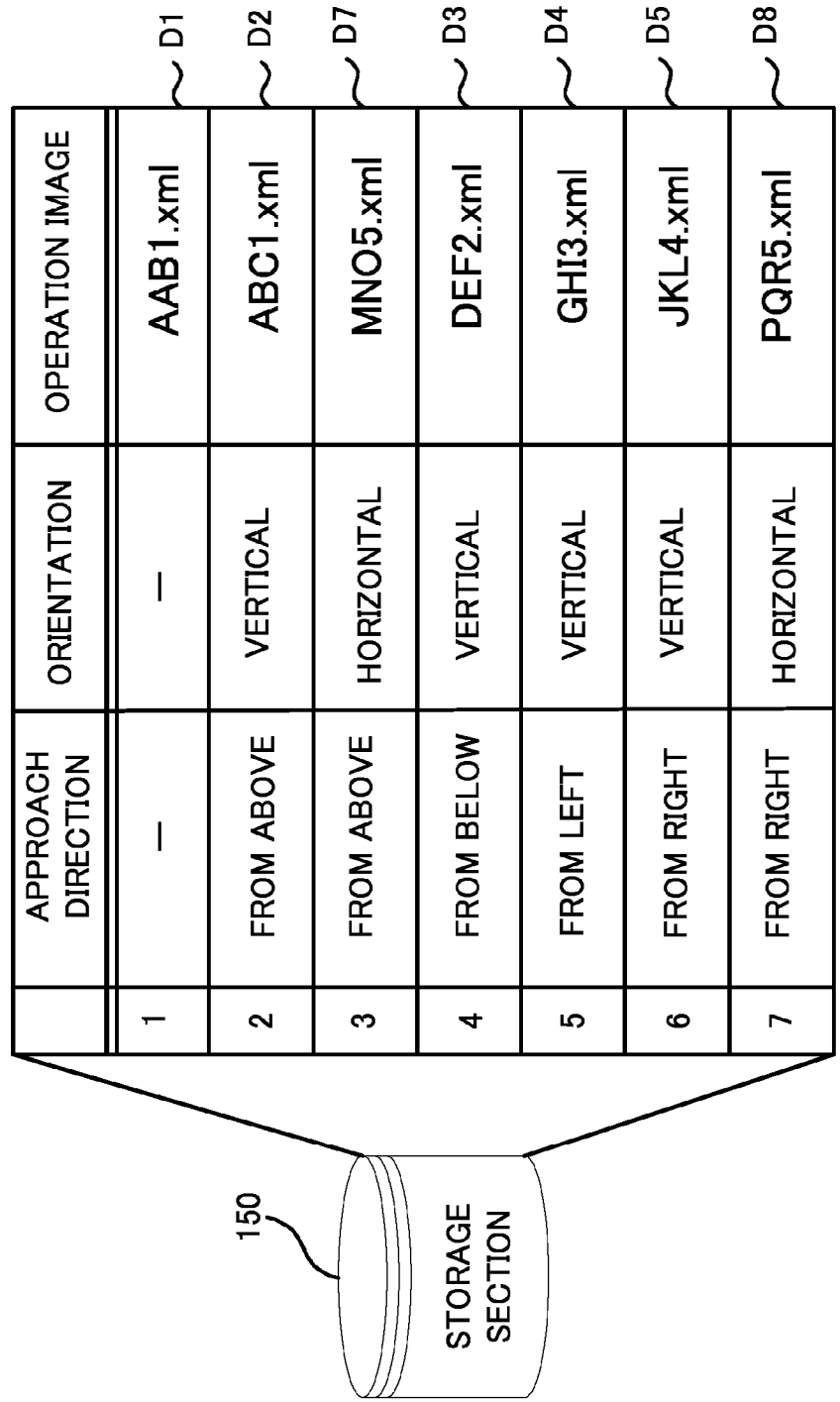
FIG. 10 is a view showing contents of data stored in a storage section of an image forming apparatus according to Modified Example.

FIG. 10 is a view showing contents of data stored in a storage section 150 of the image forming apparatus 10 according to Modified Example 1. In an example shown in FIG. 10, second operation images D2 to D8 are stored in the storage section 150 each associated with the combination of the approach direction in which the portable terminal device 20 approaches a display section 130 and the orientation of the portable terminal device 20.

FIG. 11 is a view showing an image displayed on a display 211 of the portable terminal device 20 in a case where the portable terminal device 20 makes an approach from the right of the display section 130 in a horizontal posture. In this case, displayed on the display 211 of the portable terminal device 20 is the second operation image D8 associated with "approach direction: from the right, orientation: horizontal". Provided on the second operation image D8 is, for example, a program button d6 associated with a print job program 7 for which copy concentration and an original copy size are set. On the other hand, in a case where the portable terminal device 20 approaches the display section 130 from the right thereof in a vertical posture, as shown in FIG. 8, displayed on the display 211 of the portable terminal device 20 is the second operation image D5 associated with "approach direction: from the right, orientation: vertical".

Figure 12B:
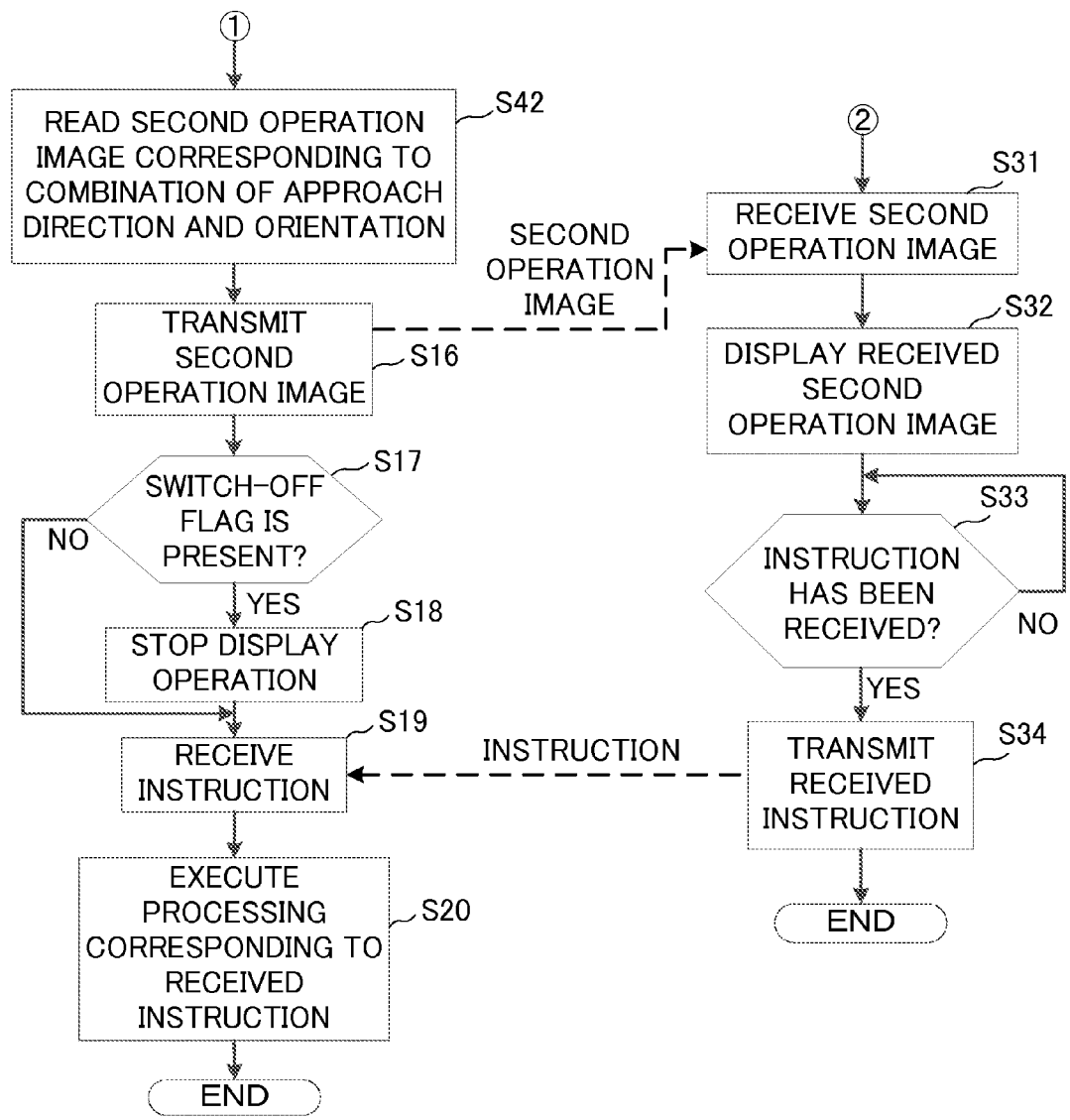

FIG. 12A and FIG. 12B are flowchart showing a flow of operation of the image forming apparatus 10 and the portable terminal device 20 according to Modified Example 1. The same processing as that of the flowchart shown in FIG. 9 is provided with the same numerals and thus is omitted from the description.

After the processing of step S14, a communication control section 104 of the image forming apparatus 10 allows a network interface section 170 to transmit, towards the portable terminal device 20, a transmission request for transmitting information indicating the orientation of the portable terminal device 20 (step S40).

A communication control section 204 of the portable terminal device 20 allows a network interface section 240 to receive the transmission request transmitted from the image forming apparatus 10 in the processing of step S40 (step S50).

After the processing of step S50, a display control section 201 acquires the orientation of the portable terminal device 20 based on a detection signal outputted from an orientation sensor 220 (step S51).

A communication control section 204 allows the network interface section 240 to transmit, towards the image forming apparatus 10, information indicating the orientation of the portable terminal device 20 acquired in the processing of step S51 (step S52).

The communication control section 104 of the image forming apparatus 10 allows the network interface section 170 to receive the information indicating the orientation of the portable terminal device 20 transmitted from the portable terminal device 20 (step S41).

After the processing of step S41, the communication control section 104 reads, from the storage section 150, the second operation image associated with the combination of the approach direction and the orientation of the portable terminal device 20 (step S42).

As described above, with the image forming apparatus 10 and the portable terminal device 20 according to Modified Example 1, in accordance with the orientation of the portable terminal device 20 in addition to the approach direction of the portable terminal device 20, a kind of the operation image displayed on the display 211 of the portable terminal device 20 can be changed.

Modified Example 2

In an image forming apparatus 10 according to Modified Example 2, a display control section 102 allows a display section 130 to display, in addition to a first operation image, contents of a second operation image displayed at a portable terminal device 20 when the portable terminal device 20 approaches the display section 130, and an image indicating an approach direction associated with the second operation image.

FIG. 13 is a view showing one example of a display image D9 displayed at the display section 130 in the image forming apparatus 10 according to Modified Example 2. Provided on the display image D9 are: the contents of the second operation image displayed at the portable terminal device 20; and images d7 to d10 each indicating the approach direction associated with the second operation image. This display image D9 is displayed at the display section 130 at timing at which the operation mode of the image forming apparatus 10 switches to the operation image transmission mode. The user can, through this display image D9, check the contents of the second operation image displayed at the portable terminal device 20.

Modified Example 3

Figure 14:
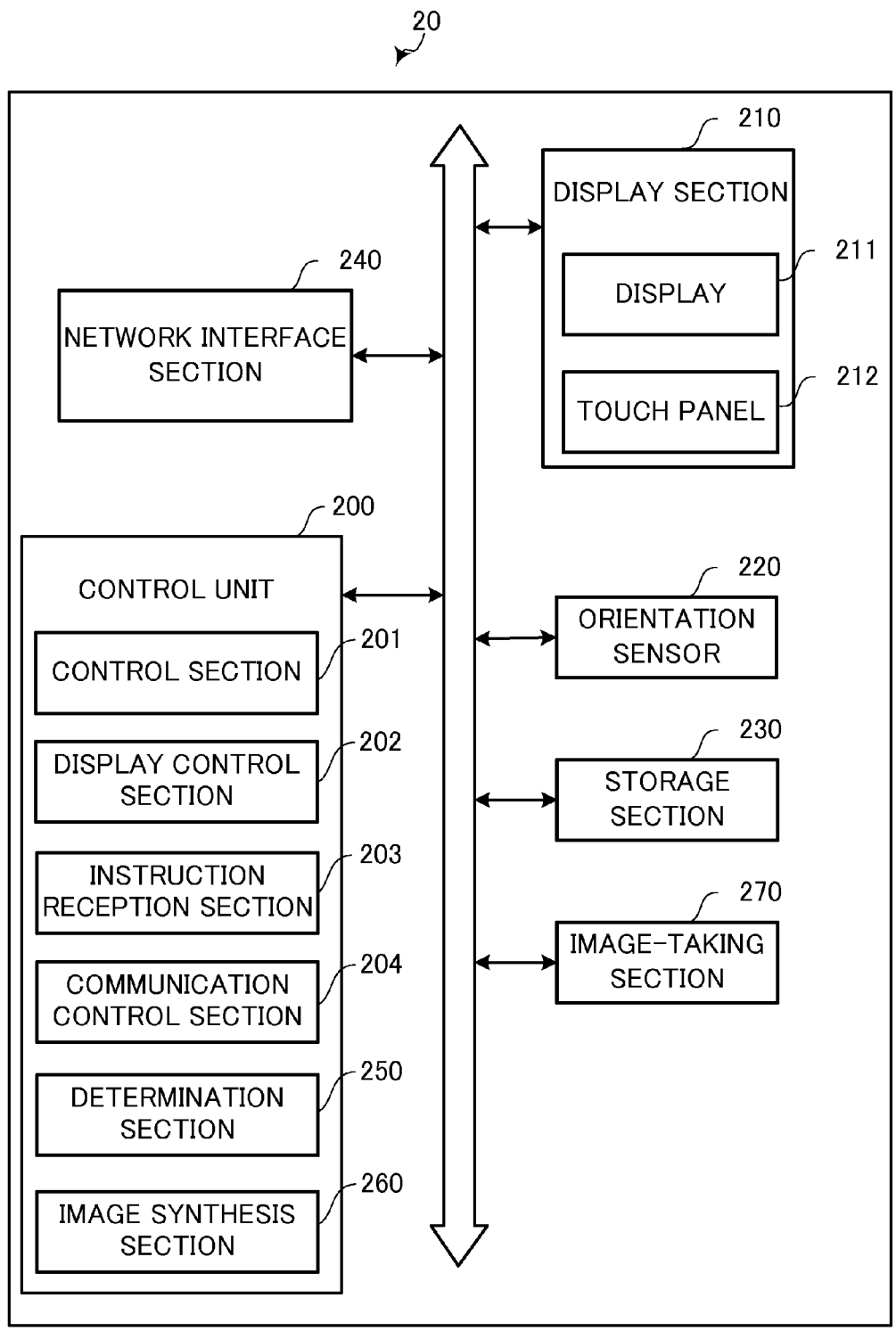
FIG. 14 is a block diagram showing inner configuration of a portable terminal device according to Modified Example 3.

FIG. 14 is a block diagram showing inner configuration of a portable terminal device 20 according to Modified Example 3. Note that the same configuration as that shown in FIG. 2 is provided with the same numeral and is thus omitted from the description.

An image taking section 270 is a camera device having an image taking element which takes an image.

A determination section 250 performs image processing such as pattern matching on the image taken by the image taking section 270, and determines whether or not this image includes an image indicating the display section 130 of the image forming apparatus 10.

In a case where the image taken by the image taking section 270 includes the image indicating the display section 130, an image synthesis section 260 generates a synthetic image obtained by synthesizing a second operation image with the image taken by the image taking section 270 at a position of an approach direction associated with the second operation image. The image synthesis section 260 generates, as the synthesis image, for example, an image as shown in FIG. 6.

FIG. 15 is a flowchart showing a flow of operation of the portable terminal device 20 according to Modified Example 3. If the image is taken by the image taking section 270 (YES in step S60), the determination section 250 determines whether or not the taken image includes the image indicating the display section 130 (step S61).

If the image indicating the display section 130 is not included (No in step S61), the portable terminal device 20 ends the processing. On the other hand, if the image indicating the display section 130 is included (Yes in step S61), a communication control section 204 allows a network interface section 240 to transmit, towards the image forming apparatus 10, a transmission request for transmitting the second operation image and information indicating the approach direction associated with this second operation image (step S62).

Upon reception of the transmission request transmitted in the processing of step S62 by the image forming apparatus 10 (step S70), the communication control section 104 reads, from the storage section 150, the second operation image and the information indicating the approach direction associated with this second operation image (step S71), and allows the network interface section 170 to transmit this read information towards the portable terminal device 20 (step S72).

Upon reception of the information transmitted in the processing of step S72 by the portable terminal device 20 (step S63), the image synthesis section 260 uses this received information to generate a synthetic image (step S64). Then a display control section 202 allows a display 211 to display the synthetic image generated in the processing of step S64 (step S65).

As described above, with the portable terminal device 20 according to Modified Example 3, by performing operation of taking an image of the display section 130 by use of the image taking section 270 by the user, contents of the second operation image displayed at the portable terminal device 20 can be checked.

Modified Example 4

With a portable terminal device 20 according to Modified Example 4, if an instruction reception section 203 has received a predefined instruction after receiving a second operation image and information of an approach direction associated with this second operation image from the image forming apparatus 10, a display control section 202 allows a display section 210, for an image indicating the display section 130 of the image forming apparatus 10, to display the second operation image arranged at a position of the approach direction associated with the second operation image, that is, an image as shown in FIG. 6.

As a result, by using, for example, a touch panel 212 to input a predefined instruction in the portable terminal device 20 by the user, contents of the second operation image displayed at the portable terminal device 20 can be checked.

Moreover, the display control section 202, in the aforementioned image display, causes display of a portion indicating the display section 130 of the image forming apparatus 10 with a solid line and display of a portion indicating the second operation image with a broken line (see FIG. 6). This consequently can bring in the user an image such that the second operation images D2 to D5 as shown in FIG. 6 are virtually arranged in the spaces above, below, on the right of, and on the left of the display section 130. As a result, bringing the portable terminal device 20 closely to the display section 130 of the image forming apparatus 10 makes it easy for the user to understand that the second operation images D2 to D5 are displayed at the portable terminal device 20.

Modified Example 5

In an image forming apparatus 10 according to Modified Example 5, in a case where a route of communication with the portable terminal device 20 has been established and the portable terminal device 20 has turned into a state in which it can display a second operation image, a display control section 102 allows a display section 130 to perform display operation reporting this.

Here, the state in which the portable terminal device 20 can display the second operation image means a state after the portable terminal device 20 received, form the image forming apparatus 10, the second operation image and information of an approach direction associated with this second operation image. If the portable terminal device 20 has turned into the state in which it can display the second operation image, the portable terminal device 20 transmits, towards the image forming apparatus 10, a signal notifying this. The image forming apparatus 10, upon reception of this signal, allows the display section 130 to perform the display operation of reporting that the portable terminal device 20 has turned into the state in which it can display the second operation image. For example, the display control section 102 performs the aforementioned reporting by flickering an end part of the display section 130. Moreover, the display control section 102 may allow the display section 130 to display a message screen indicating this.

In such an image forming apparatus 10 according to Modified Example 5, it can be reported to the user that the portable terminal device 20 has turned into the state in which it can display the second operation image.

Other Modified Examples

The embodiments described above and each Modified Example described above can be combined together.

Moreover, the information processing program, the portable terminal device control program, etc. described in the embodiments and Modified Examples above can be stored in a computer-readable non-transitory recording medium, for example, a hard disc, a CD-ROM, a DVD-ROM, or a semiconductor memory. In this case, the computer-readable non-transitory recording medium in which the information processing program, the portable terminal device control program, etc. are recorded serves as one embodiment of this disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication device comprising:
a communication section capable of transmitting and receiving data to and from an external information processing apparatus;
a communication control section controlling communication operation performed by the communication section, wherein the communication control section allowing the communication section to receive, from the information processing apparatus, an operation image stored in association with a direction from which the communication device approaches a display section of the information processing apparatus, the direction being any one of directions from above, from below, on a right of, and on a left of the display section, among a plurality of operation images stored in the information processing apparatus;

a display section;

a display control section allowing the display section to display the operation image received by the communication section; and an instruction reception section receiving an instruction corresponding to operation on the operation image displayed at the display section, wherein the communication control section allows the communication section to transmit, to the information processing apparatus, the instruction received by the instruction reception section the communication device further comprises:

an image-taking section taking an image;

a determination section determining whether or not the image taken by the image-taking section includes an image indicating the display section of the information processing apparatus; and an image synthesis section generating a synthetic image by use of the image taken by the image-taking section, wherein, in a case where the determination section determines the image includes the image indicating the display section of the information processing apparatus, the communication control section allows the communication section to: transmit to the information processing apparatus a transmission request for transmitting the plurality of operation images and information of the directions from above, from below, on the right of, and on the left of the display section associated respectively with each of the plurality of operation images; and receive, from the information processing apparatus, the operation image and information of any one of the directions from above, from below, on the right of, and on the left of the display section associated with the operation image, the image synthesis section generates a synthetic image obtained by respectively synthesizing, for the image taken by the image-taking section, the plurality of operation images received by the communication section at positions of any of the directions from above, from below, on the right of, and on the left of the display section associated with the operation image, and the display control section allows the display section to display the synthetic image obtained through the synthesis by the image synthesis section.

2. The communication device according to claim 1, further comprising a detected section detected by an approach detection sensor provided in the information processing apparatus.

3. The communication device according to claim 1, wherein, in a case where the communication section has established a route for communication with the information processing apparatus, the communication control section allows the communication section to receive, from the information processing apparatus, the operation image and information of any one of the directions from above, from below, on the right of, and on the left of the display section associated with the operation image, and in a case where the instruction reception section has received a predefined instruction, the display control section allows the display section to display, for the image indicating the display section of the information processing apparatus, an image obtained by arranging the operation image received by the communication section at a position of any one of the directions from above, from below, on the right of, and on the left of the display section associated with the operation image.

4. The communication device according to claim 3, wherein the display control section allows the display section to display a portion indicating the display section of the information processing apparatus with a solid line and display a portion indicating the operation image received by the communication section with a broken line.

5. The communication device according to claim 1, wherein the communication control section further allows the communication section to receive, from the information processing apparatus, in addition to the operation image, position information indicating a position of the communication device with an installation position of the display section as a reference position, and the display control section allows the display section to display the operation image received by the communication section at the position specified by the position information.

6. The communication device according to claim 1, wherein the display control section allows the display section to display one of the operation images positioned at any one of the directions from above, from below, on the right of, and on the left of the display section of the plurality of operation images in a range according to a position of the portable terminal device.

7. An information processing system comprising an information processing apparatus and a communication device capable of communicating with the information processing apparatus, wherein the information processing apparatus comprises:

a display section displaying a first operation image provided for user operation;

a display control section controlling display operation performed by the display section;

a detection section detecting a direction from which the communication device approaches the display section, the direction being any one of directions from above, from below, on a right of, and on a left of the display section;

a storage section storing, in addition to the first operation image displayed at the display section, a plurality of second operation images each associated respectively with any one of the directions detected by the detection section;

a communication section;

a communication control section reading, from the storage section, one of the plurality of second operation images associated with any one of the directions detected by the detection section, allowing the communication section to transmit the read second operation image to the communication device, and also to receive, from the communication device, an instruction corresponding to operation inputted in the communication device on the second operation image transmitted to the communication device;

an instruction reception section receiving, in addition to an instruction corresponding to operation on the first operation image displayed at the display section, an instruction that the communication control section have allowed the communication section to receive; and an execution section executing processing corresponding to the instruction received by the instruction reception section the communication device comprises:

a terminal side communication section;

a terminal side communication control section controlling communication operation performed by the terminal side communication section, wherein the terminal side communication control section allowing the terminal side communication section to receive, from the information processing apparatus, the plurality of second operation images stored in association with any one of directions from above, from below, on the right of, and on the left of the display section of the communication device approaching a display section of the information processing apparatus, among the plurality of second operation images stored in the information processing apparatus;

a terminal side display section;

a terminal side display control section allowing the terminal side display section to display the second operation image received by the terminal side communication section; and a terminal side instruction reception section receiving an instruction corresponding to operation on the second operation image displayed at the terminal side display section, wherein the terminal side communication control section allowing the terminal side communication section to transmit, to the information processing apparatus, the instruction received by the terminal side instruction reception section, the communication device further comprises:

an image-taking section taking an image;

a determination section determining whether or not the image taken by the image-taking section includes an image indicating the display section of the information processing apparatus; and an image synthesis section generating a synthetic image by use of the image taken by the image-taking section, wherein, in a case where the determination section determines the image includes the image indicating the display section of the information processing apparatus, the terminal side communication control section allows the terminal side communication section to: transmit to the information processing apparatus a transmission request for transmitting the plurality of operation images and information of the directions from above, from below, on the right of, and on the left of the display section associated respectively with each of the plurality of operation images; and receive, from the information processing apparatus, the operation image and information of any one of the directions from above, from below, on the right of, and on the left of the display section associated with the operation image, the image synthesis section generates a synthetic image obtained by respectively synthesizing, for the image taken by the image-taking section, the plurality of operation images received by the terminal side communication section at positions of any of the directions from above, from below, on the right of, and on the left of the display section associated with the operation image, and the terminal side display control section allows the display section to display the synthetic image obtained through the synthesis by the image synthesis section.

\* \* \* \* \*